(12) United States Patent
Trombetta et al.

(10) Patent No.: US 10,143,928 B2
(45) Date of Patent: *Dec. 4, 2018

(54) BROADCAST INITIATION WITHOUT INTERRUPTION TO ACTIVE GAMEPLAY

(71) Applicant: Microsoft Technology Licensing, LLC, Redmond, WA (US)

(72) Inventors: Steven Trombetta, Seattle, WA (US); Travis John Muhlestein, Redmond, WA (US); Joanna Mason, Redmond, WA (US); Christian Klein, Duvall, WA (US); Corey E. Rogers, Redmond, WA (US); Ryan Y. Kim, Bellevue, WA (US); Sudhakar V. Prabhu, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 492 days.

This patent is subject to a terminal disclaimer.

(21) Appl. No.: 14/484,163

(22) Filed: Sep. 11, 2014

(65) Prior Publication Data

US 2015/0298010 A1    Oct. 22, 2015

Related U.S. Application Data

(60) Provisional application No. 61/981,651, filed on Apr. 18, 2014.

(51) Int. Cl.
*A63F 9/24* (2006.01)
*A63F 13/00* (2014.01)
*G06F 17/00* (2006.01)
*G06F 19/00* (2018.01)
*A63F 13/87* (2014.01)
*A63F 13/31* (2014.01)
*A63F 13/86* (2014.01)
*A63F 13/30* (2014.01)

(52) U.S. Cl.
CPC .............. *A63F 13/87* (2014.09); *A63F 13/30* (2014.09); *A63F 13/31* (2014.09); *A63F 13/86* (2014.09)

(58) Field of Classification Search
USPC ...................... 463/20, 22, 31, 32, 39, 40, 42
See application file for complete search history.

(56) References Cited

U.S. PATENT DOCUMENTS

2002/0034980 A1 * 3/2002 Lemmons ............... A63F 3/081
463/40
2006/0161621 A1    7/2006 Rosenberg
(Continued)

OTHER PUBLICATIONS

Davies, Chris, "Livestream for Glass turns Glassholes into Roving Reporters", Published on: Apr. 7, 2014, Available at: http://www.slashgear.com/livestream-for-glass-turns-glassholes-into-roving-reporters-07324086/.

(Continued)

*Primary Examiner* — Adetokunbo O Torimiro
(74) *Attorney, Agent, or Firm* — Alleman Hall Creasman & Tuttle LLP

(57) ABSTRACT

A video game application is executed on a computer gaming device. While the video game application is providing active gameplay, the computer gaming device receives a command to broadcast the active gameplay. Responsive to the command, the computer gaming device broadcasts the active gameplay without interrupting the active gameplay.

20 Claims, 13 Drawing Sheets

(56) References Cited

U.S. PATENT DOCUMENTS

| | | | | |
|---|---|---|---|---|
| 2006/0287106 | A1* | 12/2006 | Jensen | A63F 13/335 463/42 |
| 2008/0045338 | A1* | 2/2008 | Walker | G06F 3/01 463/40 |
| 2009/0280803 | A1* | 11/2009 | Choi | H04H 20/26 455/426.1 |
| 2010/0083300 | A1* | 4/2010 | Lyou | H04N 7/165 725/27 |
| 2012/0184362 | A1 | 7/2012 | Barclay et al. | |
| 2013/0123019 | A1* | 5/2013 | Sullivan | A63F 13/12 463/42 |
| 2013/0260896 | A1 | 10/2013 | Miura et al. | |
| 2014/0031121 | A1* | 1/2014 | Kern | A63F 13/355 463/33 |
| 2014/0187317 | A1* | 7/2014 | Kohler | H04N 21/4402 463/31 |

OTHER PUBLICATIONS

Shuman, SID, "PS4 System Software Update 1.50 Details", Published on: Oct. 25, 2013, Available at: http://blog.us.playstation.com/2013/10/25/ps4-system-software-update-1-50-details/.

Amlie, Kristian, "Realtime Capture and Streaming of Gameplay Experiences", Published on: Jul. 2007, Available at: http://www.diva-portal.org/smash/get/diva2:565823/FULLTEXT01.pdf.

"Introducing a Truly Next-Gen Twitch Experience on Xbox One", Published on: Feb. 25, 2014, Available at: http://news.xbox.com/2014/02/xbox-one-twitch-broadcasting.

* cited by examiner

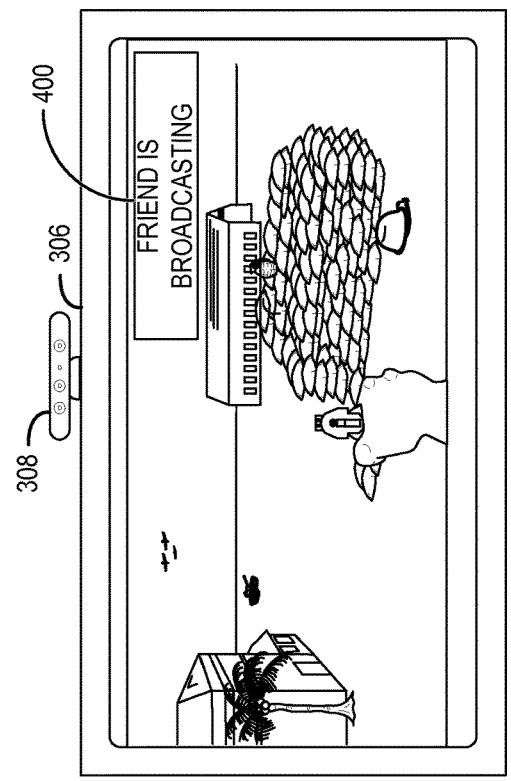
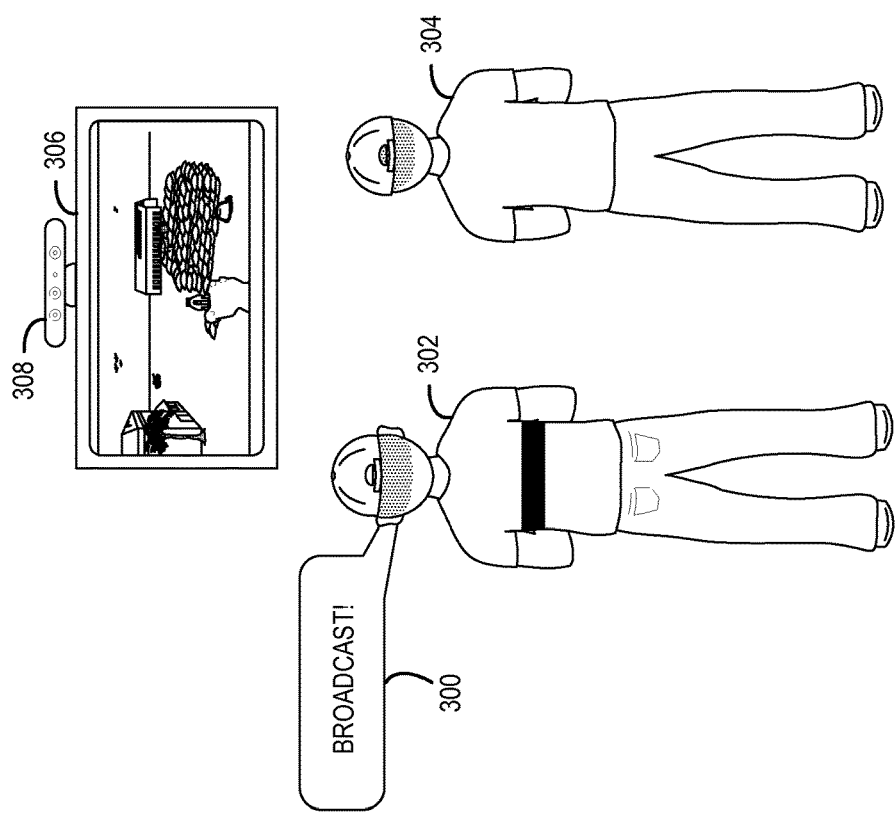
FIG. 4
FIG. 3

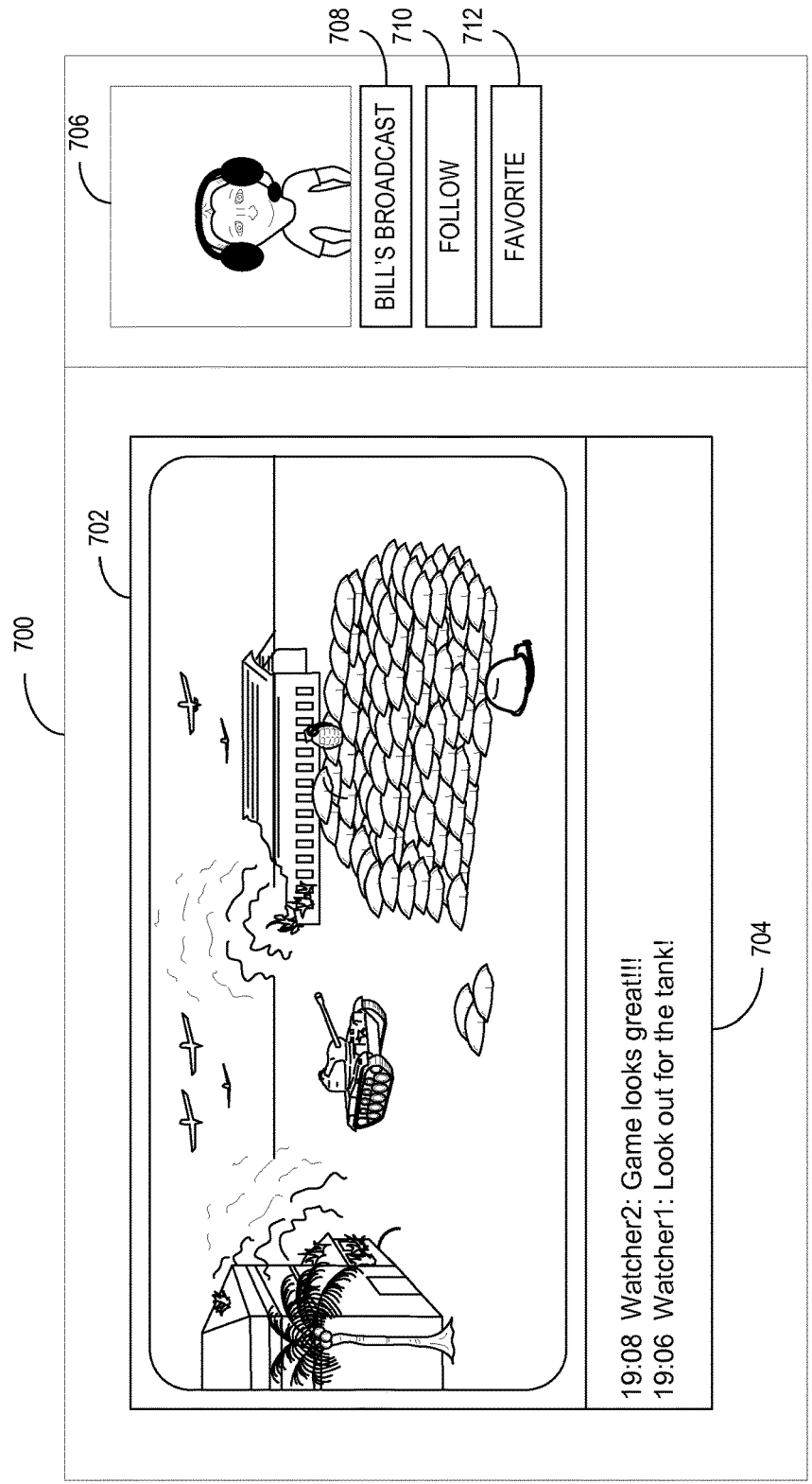

BROADCAST INITIATION WITHOUT INTERRUPTION TO ACTIVE GAMEPLAY

CROSS-REFERENCE TO RELATED APPLICATIONS

This application claims priority to U.S. Provisional Application No. 61/981,651, filed Apr. 18, 2014 and entitled "BROADCAST STREAM INITIATION", the complete contents of which are hereby incorporated herein by reference for all purposes.

BACKGROUND

Live streaming broadcasts of video gameplay sessions may be broadcast over the Internet.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various implementations relating to the initiation of a live streaming broadcast of active video gameplay are disclosed. In one implementation, a video game application is executed on a computer gaming device. While the video game application is providing active gameplay, the computer gaming device receives a command to broadcast the active gameplay. Responsive to the command, the computer gaming device broadcasts the active gameplay without interrupting the active gameplay.

BRIEF DESCRIPTION OF THE DRAWINGS

FIG. 3 shows an example of a user initiated in-game broadcasting command in a multi-player setting.

FIG. 4 shows an example broadcast notification according to an implementation of the present disclosure.

FIG. 7 shows another streaming broadcast of active gameplay of a video game application.

DETAILED DESCRIPTION

This description relates to providing live streaming broadcasting of active gameplay of a video game application from a computer gaming device.

Figure 1:
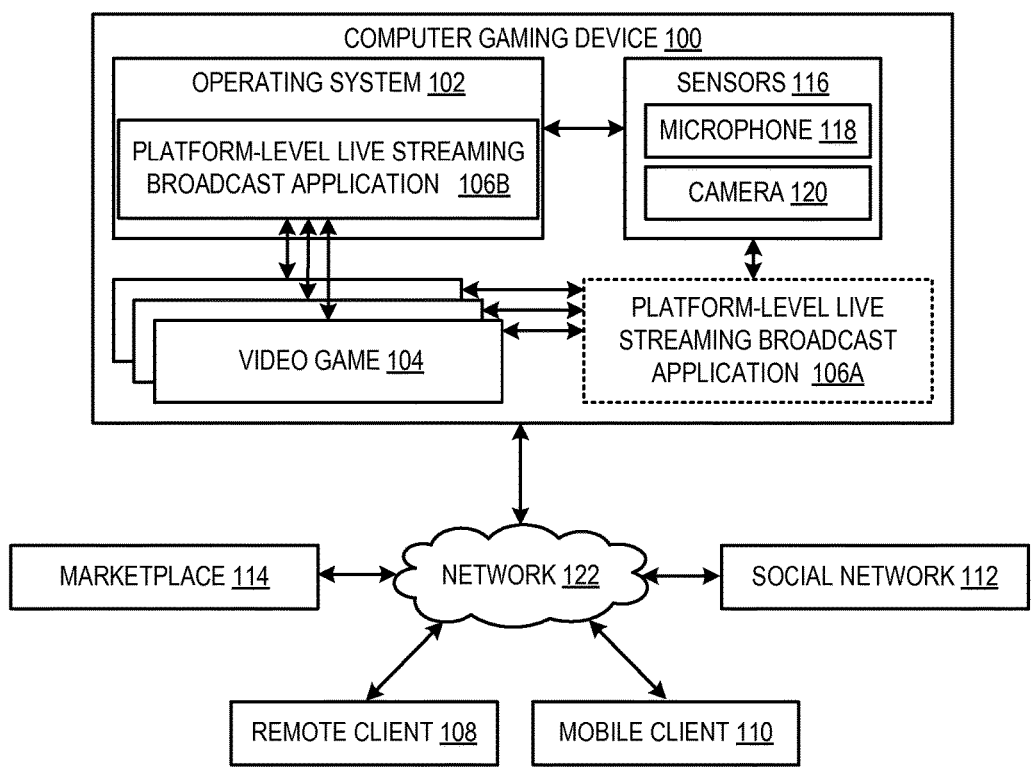
FIG. 1 schematically shows a computer gaming device and network according to an implementation of this disclosure.

FIG. 1 schematically shows a computer gaming device 100 connected to a network 122. Computer gaming device 100 is shown in simplified form. Computer gaming device 100 may take any suitable form, including a game console, entertainment computing device, portable gaming device, tablet, laptop, desktop, virtual- or augmented-reality device, or other computing device that may be used to execute a video game, live broadcast, application, and/or other content.

Computer gaming device 100 includes an operating system 102 configured to manage system resources of the computer gaming device. Further, operating system 102 may be configured to monitor, oversee, and/or manage operation of various software programs, services, and applications executed by computer gaming device 100. For example, operating system 102 establishes the software ecosystem wherein various system and third party software applications may be executed with defined access to system resources, interactions with other software applications, and permissions. Additionally, operating system 102 may present a user interface defining the mechanism of interaction of a user with computer gaming device 100. As a non-limiting example, sensors 116 may collect sensor data which may be interpreted through a natural user interface (NUI) as commands to execute specific functionalities of computer gaming device 100. For example, microphone 118 may detect speech commands from a user instructing operating system 102 of computer gaming device 100 to execute video game 104. Visual data captured by camera 120 may be processed within operating system 102 and likewise interpreted as executable gesture commands.

Additionally, operating system 102 may facilitate the interface between one or more peripherals and computer gaming device 100, thus allowing a user to provide input to computer gaming device 100 via a headset microphone, peripheral camera, companion computing device, and/or other peripheral.

Operating system 102 may also control communications between computing gaming device 100 and other computing devices via a network 122 (e.g., the Internet). The communications may include upload and download of content, streaming broadcasts, and/or shared computing.

Operating system 102 provides the software environment in which video game 104 and a platform-level live streaming broadcast application may be simultaneously executed. A platform-level live streaming broadcast application 106B may be executed as an integral part of operating system 102 or as a separate platform-level live streaming broadcast application 106A. In either configuration, platform-level live streaming broadcast application 106A/106B may oversee video game 104 and provide a live streaming broadcast of gameplay to network 122. The live streaming broadcast of the active gameplay may be hosted locally or by a remote server allowing others to access the broadcast on-demand via a remote client 108 or mobile client 110. Furthermore, the broadcast optionally may be integrated into an electronic marketplace 114 and/or a social network 112.

Platform-level live streaming broadcast application 106A/106B may provide a live streaming broadcast of active gameplay of the user/broadcaster to network 122 in a plurality of broadcast configurations. Each broadcast configuration may include any of a plurality of configurable elements such as a video and audio stream of the active gameplay, a live video stream of the broadcaster performing the active gameplay, a live audio stream of the broadcaster during active gameplay, and an interactive text log. Platform-level live streaming broadcast application 106A/106B may allow a user to define the configurable elements included in the broadcast, the format of the included elements within the broadcast, and other features of the broadcast.

Additionally, operating system 102 and/or platform-level live streaming broadcast application 106A/106B may be configured to change the broadcast configuration of the broadcast of active gameplay responsive to a received command. Furthermore, operating system 102 and/or platform-level live streaming broadcast application 106A/106B may execute the change in broadcast configuration without interruption of the active gameplay and the live broadcast. Thus, the broadcaster may actively control the content, format, features, and other aspects of the broadcast without interrupting the broadcast experience for broadcast viewers.

Operating system 102 may receive a plurality of commands from a user or broadcaster, such as to initiate a broadcast, change the broadcast configuration, change the configuration of the platform-level live streaming broadcast application, and/or terminate broadcasting. Furthermore, operating system 102 and/or platform-level live streaming broadcast application 106A/106B may receive commands while providing active gameplay of the video game application. A user may indicate a command to computer gaming device 100 by voice command, gestures, game controller input, input on a connected mobile computing device and/or peripheral device, or any other suitable means.

Additionally, operating system 102 and/or platform-level live streaming broadcast application 106A/106B may receive a command responsive to detecting a trigger event within the gaming environment of the broadcaster. For example, operating system 102 may be configured to change the broadcast configuration of the broadcast from a first broadcast configuration including a live audio stream of the broadcaster to a second broadcast configuration without a live audio stream when computer gaming device 100 detects the broadcaster activating a communication functionality of a portable communication device. Other trigger events may include an observer entering or exiting the broadcaster's gaming environment, the broadcaster entering or exiting the broadcaster's gaming environment, or any other recognizable event. A specific trigger event and the responsive change to the broadcast configuration may be defined by the user through a graphical user interface, defined within by an OS developer, broadcast application developer, game developer, or defined by any other suitable party.

Figure 2A:
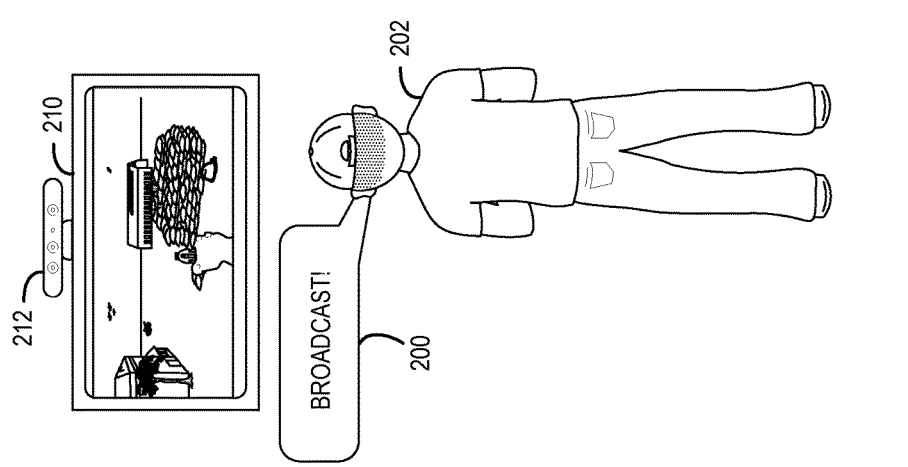
FIGS. 2A, 2B, and 2C show examples of different user initiated in-game broadcasting commands according to an implementation of this disclosure.
Figure 2B:
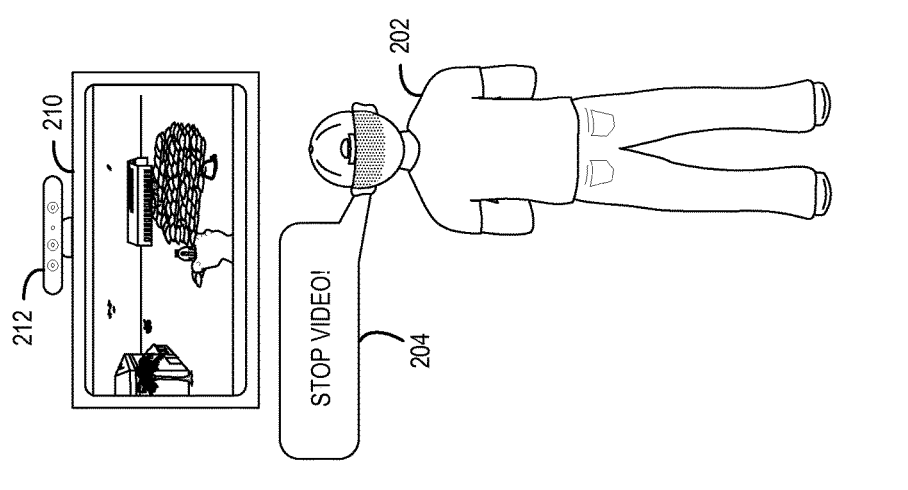
Figure 2C:
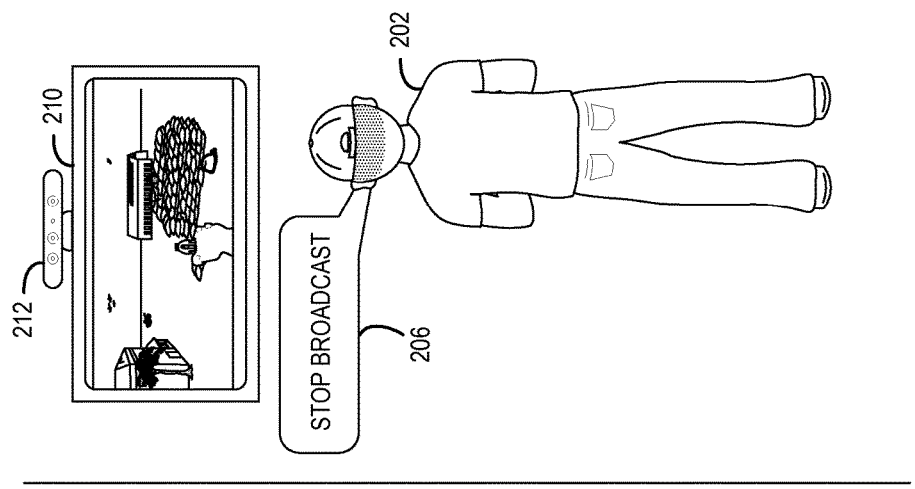

FIGS. 2A, 2B, and 2C illustrate example commands 200, 204, and 206 from a broadcaster or user 202. In FIG. 2A, user 202 is engaged in active gameplay of a video game application executed by a computer gaming device and displayed on display device 210. While the video game application is providing active gameplay, the computer gaming device may receive a live image stream and/or a live audio stream of user 202 and the gaming environment of user 202. In this manner, the computer gaming device may monitor the received video and audio streams for commands from user 202.

As a non-limiting example, user 202 may provide a command in the form of a voice command 200 to broadcast the active gameplay. The computer gaming device may receive an audio stream containing voice command 200 from a directional microphone in sensor 212. The computer gaming device may then process the received audio stream and may detect voice command 200. Responsive to voice command 200, the computer gaming device to may execute the platform-level live streaming broadcast application to broadcast the active gameplay without interrupting the active gameplay.

Furthermore, upon receipt of voice command 200, the computer gaming device may identify user 202 based upon the received audio stream and/or other information. Identification of user 202 by voice identification may be performed locally at the computer gaming device or remotely at a connected server. User 202 may also be identified based upon an image of user 202 within an image stream received by the computer gaming device. In this case, user 202 may be identified by facial recognition performed locally by the computer gaming device or remotely at a connected server. Other methods of identification of user 202 may include position data received from a directional microphone, skeletal tracking, and any other suitable identification method. Alternately, user 202 may be identified by an active network login profile or by identifying a device (e.g., mobile phone) that is detected by the computer gaming device. Upon identification of user 202, the computer gaming device may associate the broadcast of active gameplay with a broadcasting and/or social network profile of user 202.

FIG. 2B illustrates an example command to change the broadcast configuration while broadcasting. In this case, user 202 provides a voice command 204 to stop broadcasting a live video feed of the user (as captured by sensor 212). Upon receipt of voice command 204, the computer gaming device may suspend the broadcasting of the live video of the user while continuing to broadcast the game visuals themselves. The user need not pause or otherwise interrupt active gameplay to execute a command.

Other example broadcast commands may be to start video broadcast, stop audio broadcast, start audio broadcast, open or close a chat window, change the volume of the microphone output, change the arrangement and inclusion of elements of the platform-level live streaming broadcast application on the display device or within the broadcast, and/or change any other aspect of the broadcast.

FIG. 2C illustrates user 202 providing a voice command 206 to terminate broadcasting the active gameplay. Responsive to receiving voice command 206, the computer gaming device may terminate the broadcast of active gameplay without interrupting the active gameplay. That is, the user may continue to play the game without interruption although others will no longer be able to view a broadcast of the gameplay.

FIG. 3 illustrates an alternative multiplayer example where the computer gaming device is providing active gameplay to a plurality of users. In this example, a first user 302 and a second user 304 are playing the video game application together on display device 306. In this case, second user 304 is logged in as the active network login profile. The computer gaming device receives a voice command 300 to broadcast the active gameplay of the video game application from a first user 302. Upon receiving voice command 300 via sensor 308, the computer gaming device may identify the first user 302 as the user giving the command. The identification of first user 302 may be based upon sensor data received from sensor 308 as discussed above. Additionally, the computer gaming device may use a combination of sensors to identify first user 302. For example, the computer gaming device may receive an audio stream including voice command 300 and data indicating a direction to the source of voice command 300 from a directional microphone in sensor 308. The computer gaming device may process the data indicating the direction to the source and analyze a video image of the area from which the sound originated (e.g., first user 302). First user 302 may be identified based upon the image from the received image stream. Upon identification of first user 302, the broadcast may be associated with the social network profile of first user 302. If first user 302 is not identified by the computer gaming device, the broadcast may be associated with a social network profile linked with the active network login profile of second user 304. Alternatively, if first user 302 is not identified the broadcast may not be initiated or may be linked to a generic broadcasting profile.

As discussed above a user may provide the computer gaming device with a network login profile. In addition to association with a broadcast, the network login profile may be associated with a social network. Through the social network association a user may be provided with a notification 400 that a social-network friend is broadcasting as illustrated in FIG. 4. Notification 400 may also include a direct link to the broadcast, broadcast hosting service, and/or any other suitable information that will allow a user receiving notification 400 to locate and view the broadcast. It will be appreciated that notifications of broadcasts may also be provided to login profiles that a user has selected to follow and/or designated as a favorite in addition to profiles designated as friends. It will be further appreciated that in addition to notification 400 delivered during active gameplay, notifications of broadcasts of interest may be delivered while the user is watching television, personal computing, or using the computer gaming device for any other purpose. Furthermore, notifications can be sent to any device associated with the user, such as a tablet, phone, companion computing device, and/or other mobile device. Furthermore, individuals in a user's social network may likewise receive notification of the user's broadcasts. The computer gaming device and/or a companion service may include instructions executable at the initiation of a broadcast to review the social network profile associated with the broadcast and send a notification 400 to each individual within the user's social network. It will be appreciated that notification 400 may be received on another user's computer gaming device, tablet, and/or any other suitable mobile computing device.

Figure 5:
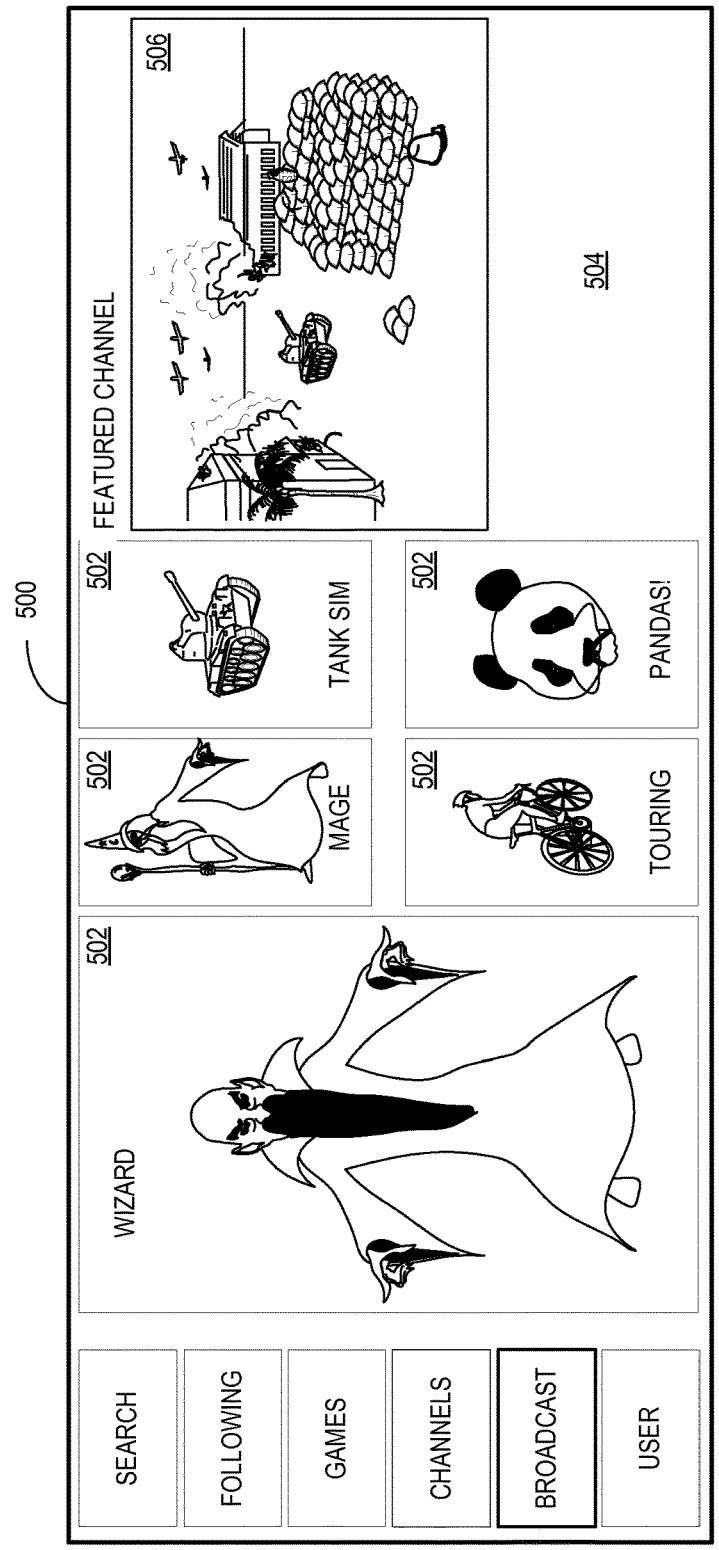
FIG. 5 shows an example menu of a broadcasting application.

FIG. 5 illustrates an example menu 500 for a platform-level live streaming broadcast application. Upon launching the platform-level live streaming broadcast application, the player may be presented with application menu 504. Application menu 504 may include search functionality, social network elements, broadcasting, or any other suitable functionality. Also included is a game and channel menu. The game and channel menu may include video game application tiles 502 representing video game applications and/or channel tiles 506 representing broadcast channels. The content of game and channel menu may include player configured elements, elements based upon video games owned by the player, analysis of player preference, and/or elements representing new and/or upcoming video games. It will be appreciated that the player may navigate either menu by any suitable means including selecting a menu option via a controller, performing a gesture, issuing a voice command, and/or controlling the interface by pupil movements.

Figure 6:
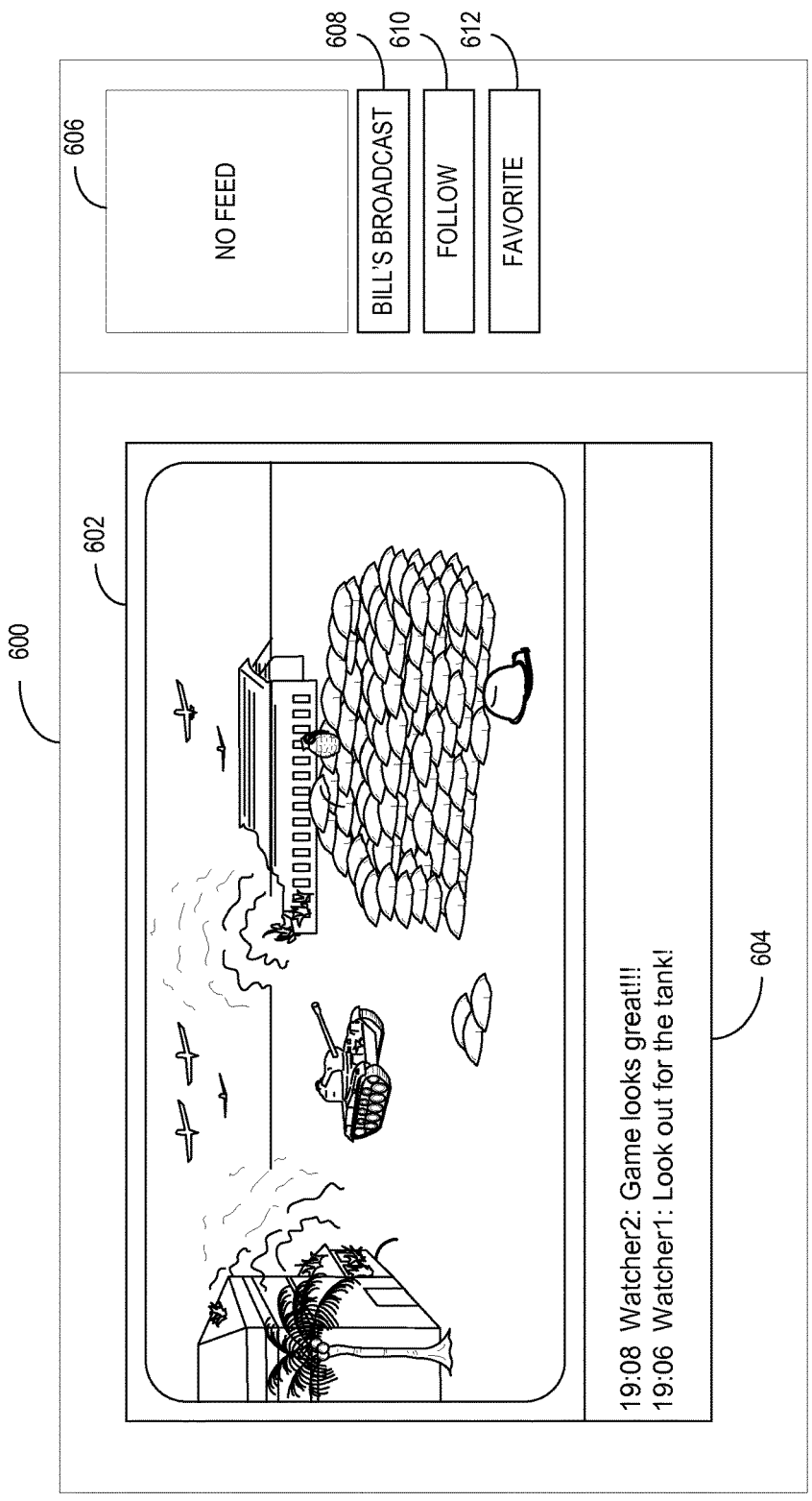
FIG. 6 shows an example streaming broadcast of active gameplay of a video game application.

FIG. 6 illustrates an example configuration of a broadcast 600 of active gameplay including a window displaying the gameplay 602, an interactive text log/chat window 604, channel identifier 608, follow object 610, and favorite object 612. As shown, chat window 604 includes comments from other users watching the broadcast and provides the capability of the player to interact with those observing the gameplay broadcast. Channel identifier 608 may also be displayed indicating the profile of the broadcaster. Channel identifier 608, follow object 610, and favorite object 612 may be rendered as executable menu options. Broadcast 600 may include a number of executables allowing a user watching the broadcast to follow the channel, view a social network profile linked to the broadcast, and/or report the channel for inappropriate content. It will be appreciated that the broadcaster may configure the broadcast channel to not include chat window 604, channel identifier 608, follow object 610, and/or favorite object 612. It will be further appreciated that the user watching the gameplay broadcast may also enable or disable chat window 604.

Optionally, the broadcaster may configure the broadcast channel to include executable links that will allow broadcast viewers to join the video gaming session. In this manner, a broadcast viewer may easily transition from viewing the broadcast to playing along with the broadcaster in an on-line multiplayer video gaming experience. Another option may include the broadcaster providing direct links within the broadcast to a party text or video chat. It will also be appreciated that links to other community functionalities may be included in the broadcast by the broadcaster.

FIG. 7 illustrates a broadcast 700 including an additional window 706 in which a live video stream of a player during the active gameplay is provided. The computer gaming device may be configured to capture the video data using both camera and microphone arrays. The computer gaming device may include instructions to use the camera to track the user in the event the player physically moves in three-dimensional space. Furthermore, the computer gaming device may include instructions to perform image processing on the captured video data prior to broadcasting the video stream. As a non-limiting example, the computer gaming device may include background removal and/or subject framing to only broadcast video of the player. Additionally, the player may initiate or cease the live video feed during gameplay as discussed with regard to FIGS. 2A-C and/or through a companion computing device. It will be appreciated that video and/or audio commentary optionally may be recorded after the active gameplay for archived video.

Figure 8A:
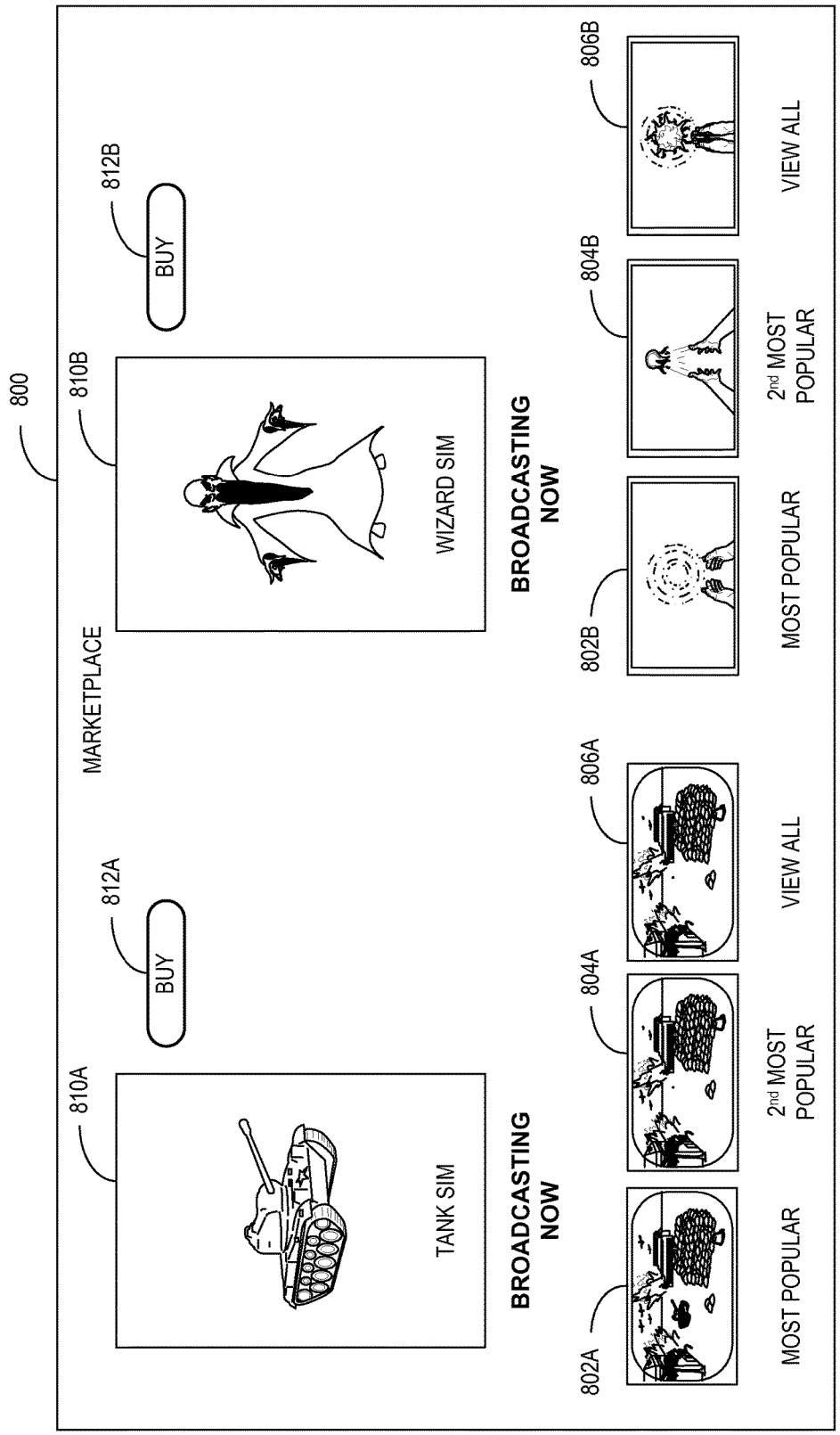
FIG. 8A shows an example of an electronic marketplace with direct links to streaming broadcasts.

As described above, live streaming broadcasts of active gameplay may be integrated into an electronic marketplace. The electronic marketplace may be operated from a remote server. Further, the electronic marketplace may be configured to be accessible by any compatible computing device including personal computers, game consoles, home entertainment computers, set top boxes, mobile phones, tablets, and web browsing devices, for example. FIG. 8A illustrates an example electronic marketplace 800 where a plurality of video game applications are available for purchase. Each of the video game applications available for purchase may be represented by a graphical tile 810A/B identifying the video game application. As used herein, a tile may be any textural, graphical, video, or other representation of a game. When included, an image within tile 810A/B may be of cover art, a main character, or other identifying image. A payment object 812A/B may also be displayed for each video game application which may be executable to initiate the purchase of the respective video game application.

Integrated into electronic marketplace 800 are preview objects 802A/B, 804A/B, and 806A/B which may be executable to initiate viewing of a live broadcast of another player's active gameplay of the video game application. Preview object 802A/B may be configured to initiate viewing of the live broadcast that currently has the most viewers. Preview object 804A/B may be configured to initiate viewing of the live broadcast that currently has a second most viewers. For each preview object 802A/B and 804A/B, the electronic marketplace may identify and display a number of viewers currently viewing each live broadcast. A third preview link 806A/B may be configured to initiate a display of a listing of all live broadcasts of the video game application. This integration allows a customer to execute preview objects 802A/B, 804A/B, 806A/B and observe the active gameplay of the video game application. Preview objects 802A/B, 804A/B, and 806A/B may be presented in the form of a hyperlink, graphical tile, live broadcast window, or other suitable format. In implementations where the preview object does not always provide live images of the associated broadcast, electronic marketplace 800 may be configured such that a mouseover, hover, or other partial selection of a preview object may result in the display of preview images from the respective live broadcast and/or a playback of a short segment of active gameplay. This integration provides the advantage of providing a customer with additional information to make a more informed decision about purchasing the game.

Each preview object may only be linked to video game platforms configured to purchase from the electronic marketplace. For example, a user visiting the electronic marketplace using a personal gaming computer would be provided preview objects which initiate viewing of broadcasts of active gameplay of the video game application from other users using a same type or class of personal gaming computer. Likewise, a user visiting the electronic marketplace from a video gaming console may be provided preview objects which initiate viewing active gameplay from other video gaming console users of the same type or class.

Figure 8B:
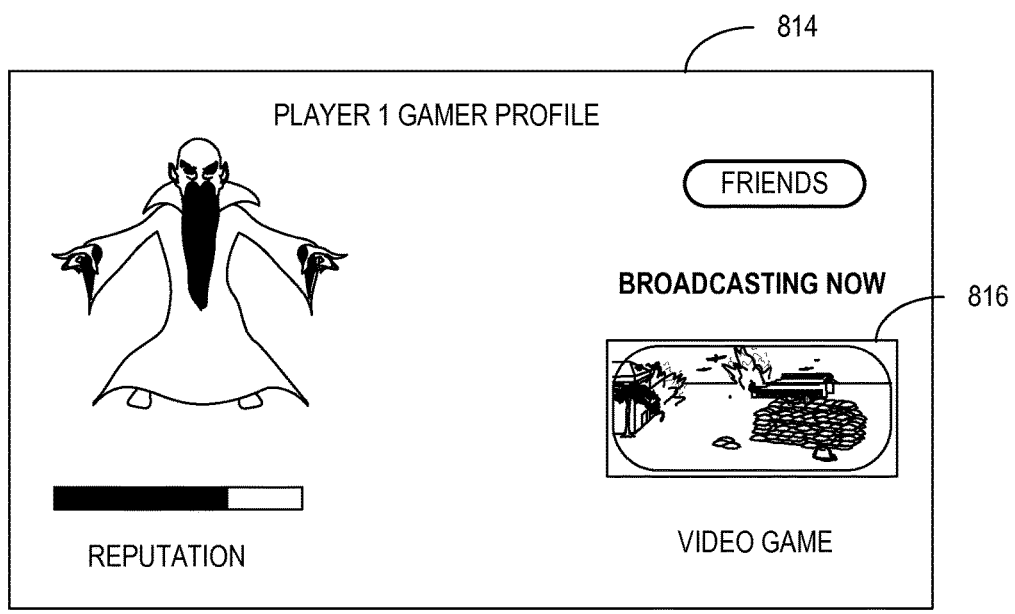
FIG. 8B shows an example of a social network profile with direct links to streaming broadcasts.

FIG. 8B illustrates an example social network profile 814 including a preview object 816 providing a direct link to a current active gameplay broadcast. Social network profile 814 may also include executables to link to or follow the social network profile. Thus, another user viewing social network profile 814 will be informed of any current broadcasts associated with the social network profile.

Social network profile 814 may be configured with a preview object 816 providing a direct link to a current broadcast from the player associated with the network profile 814. Additionally, social network profile may include executables linked to archived broadcasts from that player.

As an additional example, a computer gaming device may login and connect directly to a specific network which facilitates software updates, hosts media, on-line multi- and single player video games, and/or electronic marketplaces. Further, the network may include social network functionality providing a user with access to a community of other subscribers to the network. In this case, the network may employ a gamer profile as a specific type of a social network profile. The gamer profile may then be updated with activities of the associated user within the specific network ecosystem. Direct links to broadcasts and notifications of broadcasts may be provided to other members of the network community as discussed above with reference to FIGS. 4 and 8B. The activity updates, notifications of broadcasts, links to broadcasts, and access to the gamer profile may be serviced by and within the specific network in a closed manner. In other words, users that are not part of the network community may not have access to these features. Alternatively, such features may be offered across platforms and network ecosystems.

It will be further appreciated that a user of the computer gaming device may configure the platform-level live streaming broadcast application to avoid integrating preview object 816 into their social network profile. Further, a user may choose not to allow broadcasts of their active gameplay to be integrated into the electronic marketplace. Additionally, the remote server may contain instructions to anonymize the direct links to broadcasts of live gameplay to protect the privacy of the player.

Figure 9:
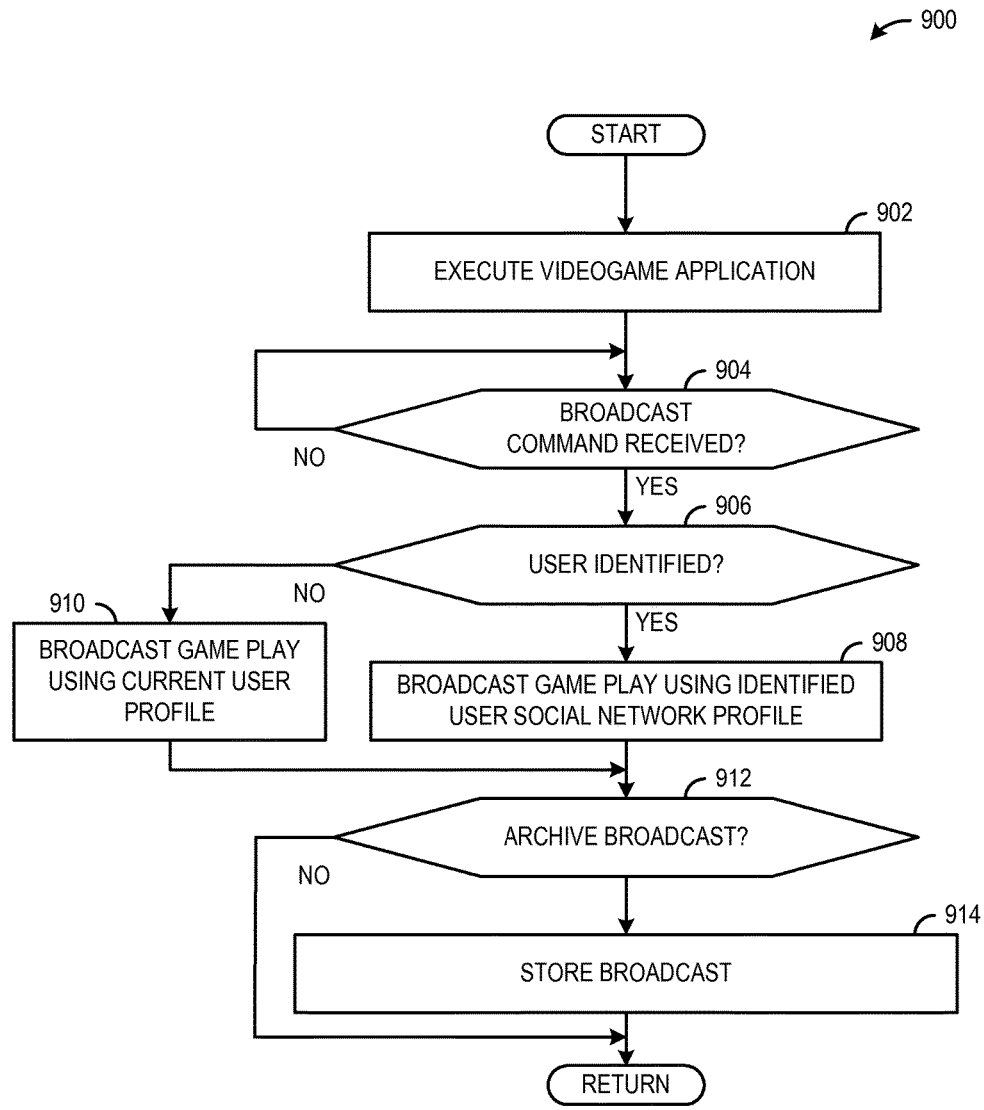
FIG. 9 shows a method for broadcasting active gameplay of a video game application.

FIG. 9 illustrates a method 900 for broadcasting live gameplay from a computer gaming device. Method 900 may be executed by a computer gaming device, for example.

At 902, method 900 includes executing a video game application. The video game application may provide active video gameplay to the user. While the video game application is providing active gameplay the user may provide a command to the computer gaming device to broadcast active gameplay of the video game application.

At 904, method 900 includes determining if a command to broadcast active gameplay of the video game application is received by the computer gaming device. The broadcast command may be provided to the computer gaming device by selecting a menu option via a controller, performing a gesture, voice command, gaze tracking, or any other suitable means. Upon receiving a command to broadcast the active gameplay, method 900 continues to 906. If not, the system can continue to wait for such a command and/or return to other operations.

At 906, method 900 includes identifying the user providing the broadcast command. The user may be identified based upon received sensor information as discussed above for FIG. 2A, an active network login profile, or any other suitable method. If the user is identified, method 900 continues to 908 and the active gameplay broadcast may be associated with a broadcast and/or social network profile of the recognized user. If the user is not recognized, method 900 continues to 910 and the active gameplay broadcast may be associated with the currently active network login profile and/or a generic broadcast profile.

At 910, method 900 includes the option to archive the broadcast. If the platform-level live streaming broadcast application is configured to archive the broadcast or a command is received from the user, method 900 proceeds to 912.

At 912, method 900 includes storing the broadcast of the active gameplay. The broadcast of the active gameplay may be stored locally by the computer gaming device, remotely at a remote server, and/or a combination of both local and remote storage. It will be appreciated that a user may provide the command to archive the broadcast while streaming. It will be further appreciated that in the event that the command to archive the broadcast is given during a broadcast of active gameplay, the computer gaming device may include any buffered data from the broadcast prior to receiving the command to archive the broadcast. The archived broadcast may include any combination of gameplay video, in-game chat logs, chat audio, and/or player video or voice commentary. The user optionally may access a previously archived gameplay broadcast and may annotate the archived broadcast by recording voice and/or video commentary.

Figure 10:
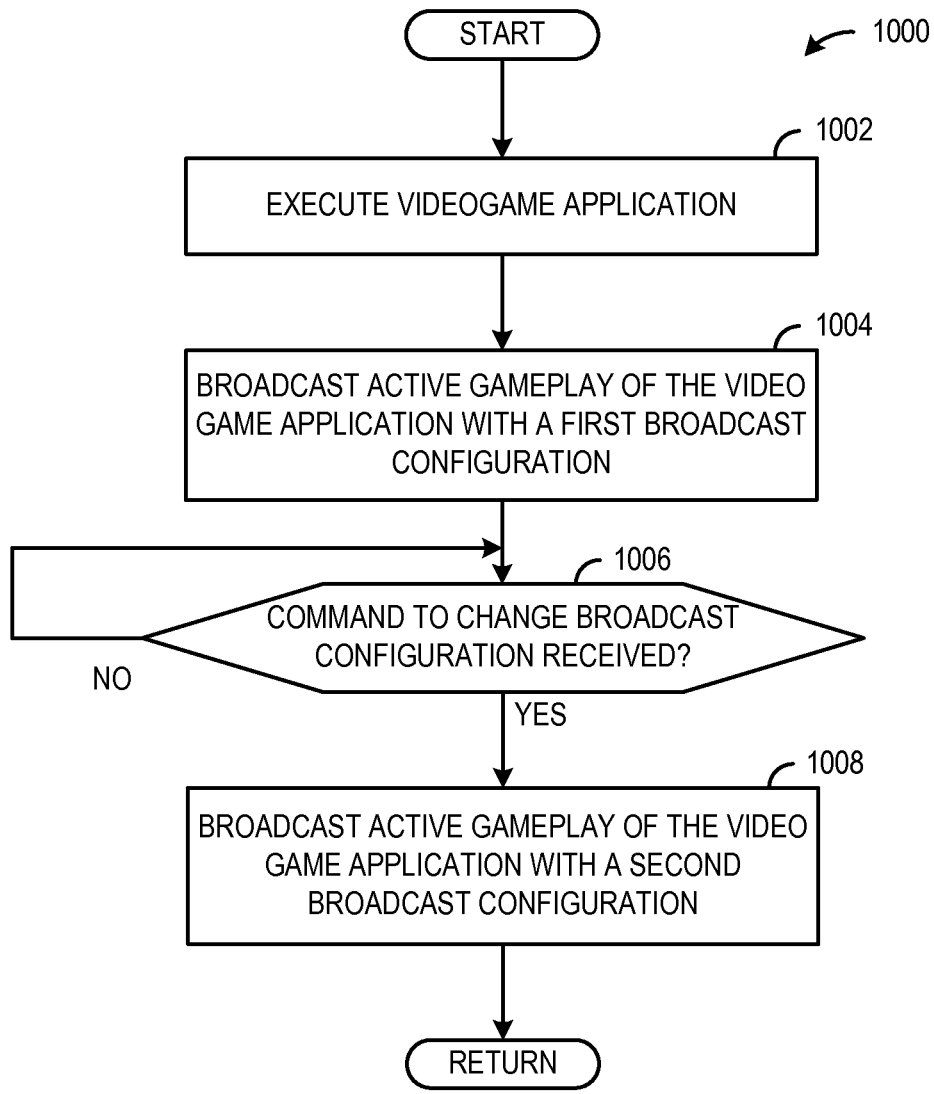
FIG. 10 shows another method for broadcasting active gameplay of a video game application.

FIG. 10 illustrates a method 1000 of broadcasting live gameplay from a computer gaming device. Method 1000 may be executed by a computer gaming device, for example.

At 1002, method 1000 includes executing a video game application.

At 1004, method 1000 includes broadcasting active gameplay of the video game application with a first broadcast configuration. For example, the first broadcast configuration may include broadcasting with a live video stream of the broadcaster's environment. Alternately, the first broadcast configuration may include any combination of the configurable elements (live video stream and/or live audio stream of the broadcaster's environment, interactive text log, etc.).

At 1006, method 1000 includes determining if a command to change the broadcast configuration is received by the computer gaming device. As an example, a command to change the broadcast configuration may include a command to broadcast without the live video feed of the broadcaster's gaming environment. As previously discussed, the command may include receiving a command from a game controller, receiving a voice command, receiving a gesture command, receiving a command from a portable communications device, detecting a trigger event, or any other suitable method. Responsive to a command to change the broadcast configuration, method 1000 continues to 1008. If a command is not received, the computer gaming device may wait until a command is received and/or return to other operations.

At 1008, method 1000 includes broadcasting the active gameplay of the video game application with a second broadcast configuration without interrupting the active gameplay or the broadcast of active gameplay. Thus, in this example, the computer gaming device may broadcast the active gameplay in the second broadcast configuration without the live video feed of the broadcaster's gaming environment. Furthermore, the computer gaming device may accomplish the broadcast configuration change without interruption of the active gameplay or the broadcast. In this way, a user may dynamically toggle aspects of the broadcast (e.g., video on/off, audio on/off, etc.) without having to stop playing the game. This can be particularly advantageous in multi-player games that do not allow for pausing the game.

Figure 11:
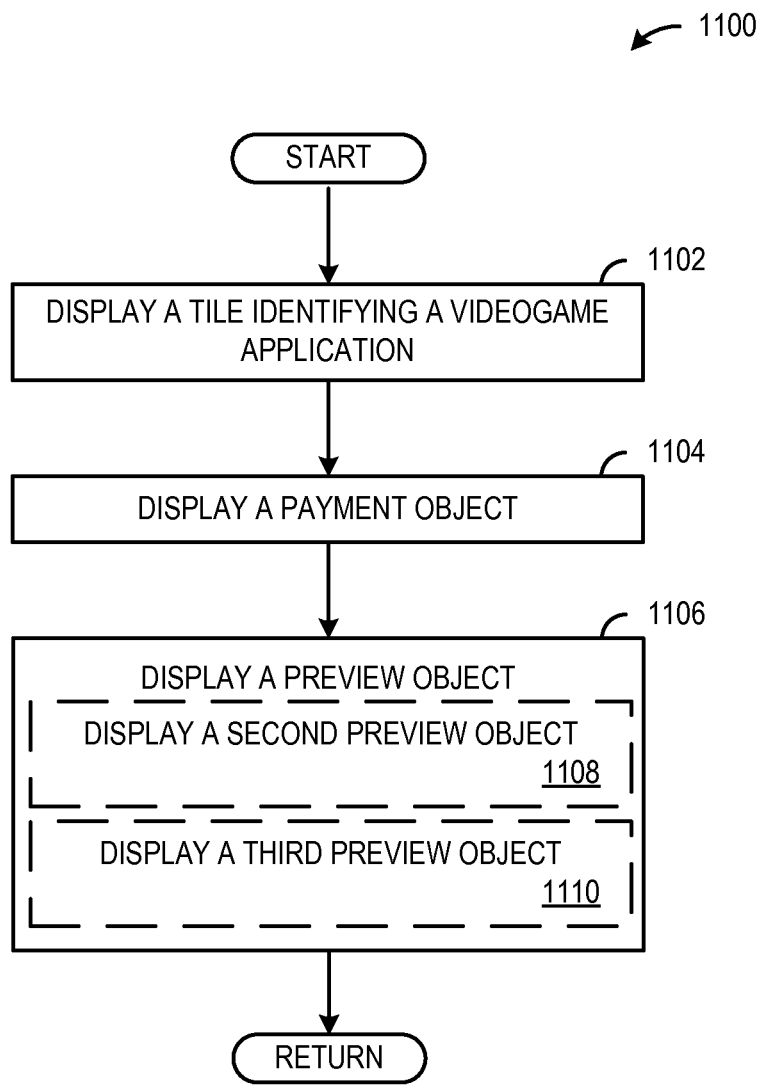
FIG. 11 shows a method of operating an electronic marketplace with direct links to streaming broadcasts.

FIG. 11 illustrates a method 1100 of operating an electronic marketplace. Method 1100 may be executed by a computer gaming device, for example.

At 1102, method 1100 includes for each of a plurality of video game applications, displaying a tile identifying a video game application.

At 1104, method 1100 includes display a payment object configured to initiate the purchase of the video game application.

At 1106, method 1100 includes displaying a preview object configured to initiate the viewing of a live broadcast of another's active gameplay of the video game application. As discussed above for FIG. 8A, the preview object optionally may be configured to initiate the viewing of a live broadcast with the most active viewers.

Optionally, at 1108, method 1100 includes displaying a second preview object configured to initiate the viewing of a different live broadcast.

Optionally at 1110, method 1100 includes displaying a third preview object configured to initiate a display of a listing of all live broadcasts of another's active gameplay of the video game application. Other preview objects can additionally or alternatively be displayed in different implementations.

Figure 12:
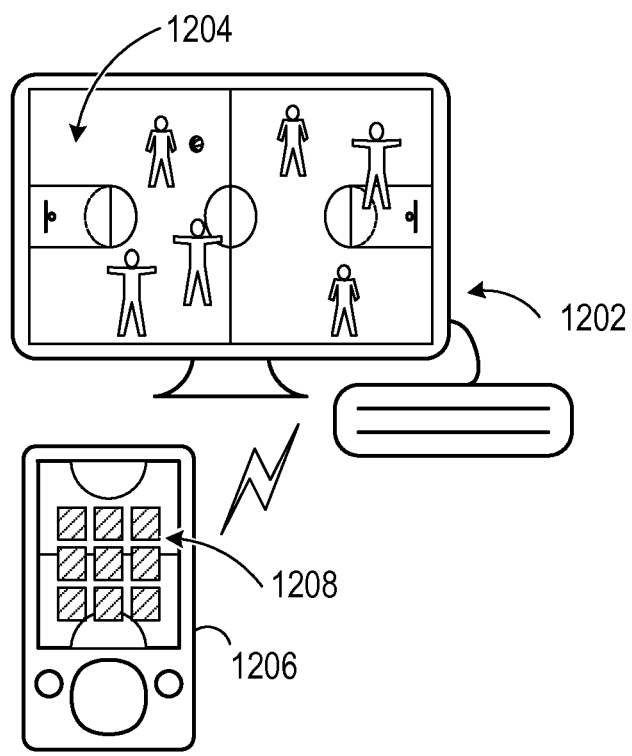
FIG. 12 shows an example of a companion computing device cooperating with a broadcasting application.

FIG. 12 illustrates a companion computing device 1206 usable to initiate and/or control the broadcast of gameplay from a currently playing video game and/or to record other types of content. As shown, computer gaming device 1202 displays rendered gameplay 1204 of a basketball video game, and companion computing device 1206 has a live streaming broadcast companion user interface 1208. In such an implementation, companion computing device 1206 may be used to control the broadcast, display, configuration, etc. of a live streaming broadcast via the live streaming broadcast companion user interface 1208. The companion computing device 1206 may be used in conjunction with computer gaming device 1202 to provide a secondary gaming experience that enhances gameplay of a video game. Non-limiting examples of companion computing device 1206 include a portable gaming device, a mobile computing device, a smartphone, etc.

In one example, the user provides input to the companion computing device that indicates a broadcast command. The live streaming broadcast command is sent from the companion computing device 1206 to the platform-level live streaming broadcast application on the computer gaming device 1202 (e.g., directly via wired or wireless communication, or via a network accessible service in communication with the companion computing device 1206 and computer gaming device 1202). In response to receiving the command selecting a broadcast channel, the platform-level live streaming broadcast application accesses the broadcast of the active gameplay or disconnects from the broadcast of the active gameplay. It will be noted that while the companion computing device 1206 is shown being used in conjunction with a computer gaming device playing a video game, the companion computing device may be used with other computing systems and may be used with types of video content other than video games. It will be appreciated that in addition to sending commands to access and disconnect from a live streaming broadcast, companion computing device 1206 may be used to send commands to change the configuration of the broadcast and the platform-level live streaming broadcast application.

In some implementations, the methods and processes described herein may be tied to a computing system of one or more computing devices. In particular, such methods and processes may be implemented as a computer-application program or service, an application-programming interface (API), a library, and/or other computer-program product.

Figure 13:
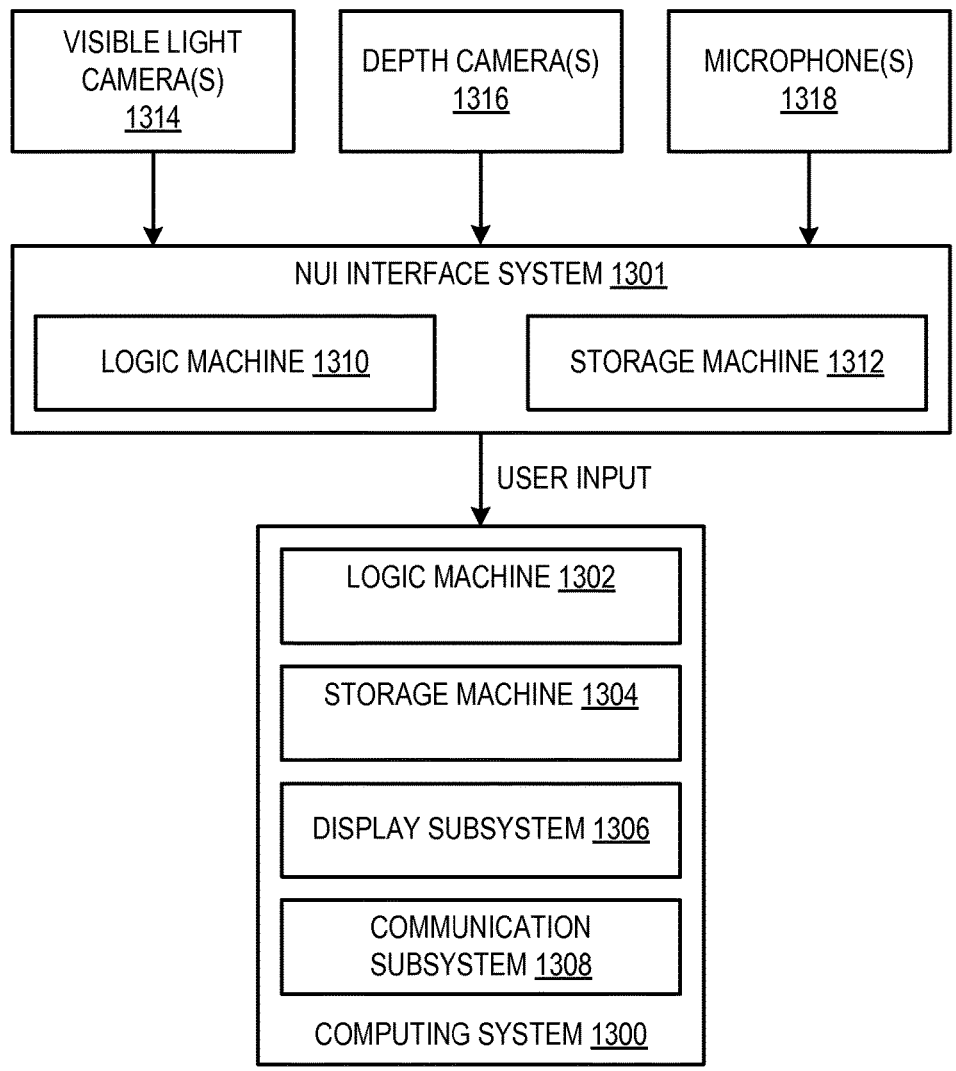
FIG. 13 shows an example computing system and a natural user interface (NUI) system.

FIG. 13 schematically shows a non-limiting implementation of a computing system 1300 that can enact one or more of the methods and processes described above. Computing system 1300 is shown in simplified form. Computing system 1300 may take the form of one or more console game systems, personal computers, server computers, tablet computers, home-entertainment computers, network computing devices, gaming devices, mobile computing devices, mobile communication devices (e.g., smart phone), and/or other computing devices. For example, computing system 1300 may take the form of computer gaming device 100 shown in FIG. 1 or companion computing device 1206 shown in FIG. 12.

Computing system 1300 includes a logic machine 1302 and a storage machine 1304. Computing system 1300 may optionally include a display subsystem 1306, a communication subsystem 1308, and/or other components not shown in FIG. 13.

Logic machine 1302 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1304 includes one or more physical devices configured to hold instructions executable by the logic machine to implement the methods and processes described herein. When such methods and processes are implemented, the state of storage machine 1304 may be transformed—e.g., to hold different data.

Storage machine 1304 may include removable and/or built-in devices. Storage machine 1304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1304 may include volatile, nonvolatile, dynamic, static, read/write, read-only, random-access, sequential-access, location-addressable, file-addressable, and/or content-addressable devices.

It will be appreciated that storage machine 1304 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1302 and storage machine 1304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1300 implemented to perform a particular function. In some cases, a module, program, or engine may be instantiated via logic machine 1302 executing instructions held by storage machine 1304. For example, the platform-level in-game recording companion may be instantiated via logic machine 1302 executing instructions held by storage machine 1304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1306 may be used to present a visual representation of data held by storage machine 1304. This visual representation may take the form of a graphical user interface (GUI). As the herein described methods and processes change the data held by the storage machine, and thus transform the state of the storage machine, the state of display subsystem 1306 may likewise be transformed to visually represent changes in the underlying data. Display subsystem 1306 may include one or more display devices utilizing virtually any type of technology. Such display devices may be combined with logic machine 1302 and/or storage machine 1304 in a shared enclosure, or such display devices may be peripheral display devices.

When included, communication subsystem 1308 may be configured to communicatively couple computing system 1300 with one or more other computing devices. Communication subsystem 1308 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem may allow computing system 1300 to send and/or receive messages to and/or from other devices via a network such as the Internet.

As noted above, an NUI interface system 1301 may be configured to provide user input to computing system 1300. To this end, the NUI interface system includes a logic machine 1310 and a storage machine 1312. To detect the user input, the NUI interface system receives low-level input (i.e., signal) from an array of sensory components, which may include one or more visible light cameras 1314, depth cameras 1316, and microphones 1318. Other example NUI componentry may include one or more infrared or stereoscopic cameras; a head tracker, eye tracker, accelerometer, and/or gyroscope for motion detection and/or intent recognition; as well as electric-field sensing componentry for assessing brain activity. In some implementations, the NUI interface system may comprise or interface with one or more user-input devices such as a keyboard, mouse, touch screen, or game controller.

The NUI interface system processes the low-level input from the sensory components to yield an actionable, high-level input to computing system 1300. Such action may generate corresponding text-based user input or other high-level commands, which are received in computing system 1300. In some implementations, NUI interface system and sensory componentry may be integrated together, at least in part. In other implementations, the NUI interface system may be integrated with the computing system and receive low-level input from peripheral sensory components.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of broadcasting gameplay from a computer gaming device, the method comprising:
   executing a video game application to produce active gameplay, the active gameplay including audiovisual content of a game environment;
   after execution of the video game application begins, and while the video game application is continuing to provide active gameplay, receiving a command from a user of the computer gaming device to broadcast the audiovisual content of the game environment;
   responsive to the command, broadcasting the audiovisual content of the game environment without interrupting the active gameplay;
   while continuing to execute the video game application to produce active gameplay and continuing to broadcast the audiovisual content of the game environment, receiving a command to terminate broadcast of the audiovisual content of the game environment without interrupting the active gameplay; and
   responsive to the command, terminating broadcast of the audiovisual content of the game environment without interrupting the active gameplay.

2. The method of claim 1, wherein receiving the command to broadcast includes:
   receiving an audio stream, the audio stream including a voice command generated by a user;
   identifying the user based on the audio stream; and
   associating broadcast of the audiovisual content of the game environment with a social network profile of the user.

3. The method of claim 1, wherein receiving the command to broadcast includes:
   receiving an image stream, the image stream including an image of a user generating the command;
   identifying the user based on the image of the user generating the command; and
   associating broadcast of the audiovisual content of the game environment with a social network profile of the user.

4. The method of claim 1, comprising associating broadcast of the audiovisual content of the game environment with a currently active network login profile.

5. The method of claim 1, comprising, while providing active gameplay to a plurality of users:
   receiving the command to broadcast the audiovisual content of the game environment from a first user of the plurality of users;
   identifying the first user;
   associating broadcast of audiovisual content of the game environment with a social network profile of the first user, the social network profile of the first user being different than a currently active network login profile.

6. The method of claim 5, wherein identifying the first user includes:
   receiving an audio stream from a directional microphone, the audio stream including a voice command generated by the first user; and
   identifying the first user based on the audio stream.

7. The method of claim 5, wherein identifying the first user includes:
   receiving an image stream from a depth camera, the image stream including an image of the first user; and
   identifying the first user based on the image of the first user from the image stream.

8. The method of claim 1, where the audiovisual content of the game environment is broadcast live.

9. A computing device comprising a sensor array, a logic machine, and a storage machine, the storage machine containing instructions executable by the logic machine to:
   execute a video game application to produce active gameplay, the active gameplay including audiovisual content of a game environment;
   after execution of the video game application begins, and while the video game application is continuing to provide active gameplay, receive a command from a user of the computing device to broadcast the audiovisual content of the game environment;
   responsive to the command, broadcast the audiovisual content of the game environment without interrupting the active gameplay;
   while continuing to execute the video game application to produce active gameplay and continuing to broadcast the audiovisual content of the game environment, receive a command to terminate broadcast of the audiovisual content of the game environment without interrupting the active gameplay; and
   responsive to the command, terminate broadcast of the audiovisual content of the game environment without interrupting the active gameplay.

10. The computing device of claim 9, comprising instructions to:
    receive an audio stream from the sensor array, the audio stream including a voice command generated by a user;
    identify the user based on the audio stream; and
    associate broadcast of the audiovisual content of the game environment with a social network profile of the user.

11. The computing device of claim 9, comprising instructions to:
    receive an image stream, the image stream including an image of the user generating the command;
    identify the user based on the image of the user generating the command; and
    associate broadcast of the audiovisual content of the game environment with a social network profile of the user.

12. The computing device of claim 9, comprising instructions to:
    provide active gameplay to a plurality of users;
    receive the command to broadcast the audiovisual content of the game environment from a first user of the plurality of users;
    responsive to the command, identify the first user; and
    associate broadcast of the audiovisual content of the game environment with a social network profile of the first user, the social network profile of the first user being different than an active network login profile.

13. The computing device of claim 12, comprising instructions to:
    receive an audio stream from a directional microphone of the sensor array, the audio stream including a voice command generated by the first user; and
    identify the first user based on the audio stream.

14. The computing device of claim 12, comprising instructions to:
    receive an image stream from a depth camera of the sensor array, the image stream including an image of the plurality of users; and
    identify the first user based on an image from the image stream.

15. The computing device of claim 12, comprising instructions to associate broadcast of the audiovisual content of the game environment with an active network login profile.

16. The computing device of claim 9, where the audiovisual content of the game environment is broadcast live.

17. A computing device comprising a sensor array including a microphone and a camera, a logic machine, and a storage machine, the storage machine containing instructions executable by the logic machine to:
  execute a video game application to produce active gameplay, the active gameplay including audiovisual content of a game environment;
  after execution of the video game application begins, and while the video game application is continuing to provide active gameplay, receive via the microphone or camera a command from a user of the computing device to broadcast the audiovisual content of the game environment;
  responsive to the command, identify the user providing the command based on sensor data received from the microphone or camera;
  associate broadcast of the audiovisual content of the game environment with a social network profile of the identified user;
  broadcast the audiovisual content of the game environment without interrupting the active gameplay;
  while continuing to execute the video game application to produce active gameplay and continuing to broadcast the audiovisual content of the game environment, receive a command to terminate broadcast of the audiovisual content of the game environment without interrupting the active gameplay; and
  responsive to the command, terminate broadcast of the audiovisual content of the game environment without interrupting the active gameplay.

18. The computing device of claim 17, comprising instructions to receive an audio stream from the microphone and identify the user based on the audio stream.

19. The computing device of claim 17, comprising instructions to receive a depth image from the camera and identify the user based on the depth image.

20. The computing device of claim 17, comprising instructions to:
  provide active gameplay to a plurality of users;
  receive the command to broadcast the audiovisual content of the game environment from a first user of the plurality of users;
  identify the first user; and
  associate broadcast of the audiovisual content of the game environment with a social network profile of the first user, the social network profile of the first user being different than a currently active network login profile.

* * * * *